US006842321B2

(12) United States Patent
Brohlin

(10) Patent No.: US 6,842,321 B2
(45) Date of Patent: Jan. 11, 2005

(54) SUPPLY INDEPENDENT LOW QUIESCENT CURRENT UNDERVOLTAGE LOCKOUT CIRCUIT

(75) Inventor: Paul L. Brohlin, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 501 days.

(21) Appl. No.: 10/106,423

(22) Filed: Mar. 26, 2002

(65) Prior Publication Data

US 2002/0141121 A1 Oct. 3, 2002

Related U.S. Application Data

(60) Provisional application No. 60/279,016, filed on Mar. 27, 2001.

(51) Int. Cl.[7] .................................................. H02H 3/24
(52) U.S. Cl. ...................................................... 361/92
(58) Field of Search ............................ 361/18, 92, 115; 327/50–53, 58, 60, 68, 77

(56) References Cited

U.S. PATENT DOCUMENTS

| 5,617,285 A | * | 4/1997 | Zitta ............................ 361/92 |
| 5,805,401 A | * | 9/1998 | Schuellein et al. ........... 361/92 |
| 5,809,247 A | | 9/1998 | Richardson et al. ... 395/200.48 |
| 5,870,559 A | | 2/1999 | Leshem et al. ........ 395/200.54 |
| 6,021,439 A | | 2/2000 | Turek et al. ................. 709/224 |
| 6,144,962 A | | 11/2000 | Weinberg et al. ............. 707/10 |
| 6,154,738 A | | 11/2000 | Call .............................. 707/4 |
| 6,237,006 B1 | | 5/2001 | Weinberg et al. ........... 707/103 |
| 6,256,739 B1 | | 7/2001 | Skopp et al. ............... 713/201 |
| 6,263,362 B1 | | 7/2001 | Donoho et al. ............. 709/207 |
| 6,278,966 B1 | | 8/2001 | Howard et al. ............... 703/23 |

FOREIGN PATENT DOCUMENTS

WO WO 98/47064 10/1998

OTHER PUBLICATIONS

Stephen G. Eick, *Visualizing Online Activity*, Communications of the ACM, Aug. 2001, vol. 44, No 8, pp. 45–50.

* cited by examiner

*Primary Examiner*—Evan Pert
(74) *Attorney, Agent, or Firm*—Alan K. Stewart; W. James Brady, III; Frederick J. Telecky, Jr.

(57) ABSTRACT

The UVLO (undervoltage lockout) circuit provides a very low quiescent current that is independent of supply voltage. The circuit includes a low voltage IPTAT (current proportional to absolute temperature) generator coupled to a comparator 24 wherein a first input of the comparator 24 is coupled to the IPTAT generator in a way that forms a bandgap voltage with respect to ground and a second input of the comparator 24 is coupled to the IPTAT generator in a way that forms a bandgap voltage with respect to a supply node. This makes the quiescent current independent of the supply voltage because there is no voltage divider between the supply node and ground.

11 Claims, 2 Drawing Sheets

SUPPLY INDEPENDENT LOW QUIESCENT CURRENT UNDERVOLTAGE LOCKOUT CIRCUIT

This application claims priority under 35 USC § 119 (e)(1) of provisional application No. 60/279,016 filed Mar. 27, 2001.

FIELD OF THE INVENTION

This invention generally relates to electronic systems and in particular it relates to undervoltage lockout circuits.

BACKGROUND OF THE INVENTION

A prior art undervoltage lockout circuit is shown in FIG. 1. This circuit consists of a low voltage bandgap 10, a low voltage comparator (i.e., comparator) 12, and resistor divider 14 from the input voltage VSS to ground PBKG. The problems associated with this circuit is the current through the resistor divider 14 is a function of input voltage and generally quite large.

SUMMARY OF THE INVENTION

A UVLO (undervoltage lockout) circuit provides a very low quiescent current that is independent of supply voltage. The circuit includes a low voltage IPTAT (current proportional to absolute temperature) generator coupled to a comparator wherein a first input of the comparator is coupled to the IPTAT generator in a way that forms a bandgap voltage with respect to ground and a second input of the comparator is coupled to the TPTAT generator in a way that forms a bandgap voltage with respect to a supply node. This makes the quiescent current independent of the supply voltage because there is no voltage divider between the supply node and ground.

DETAILED DESCRIPTION OF PREFERRED EMBODIMENTS

Figure 1:
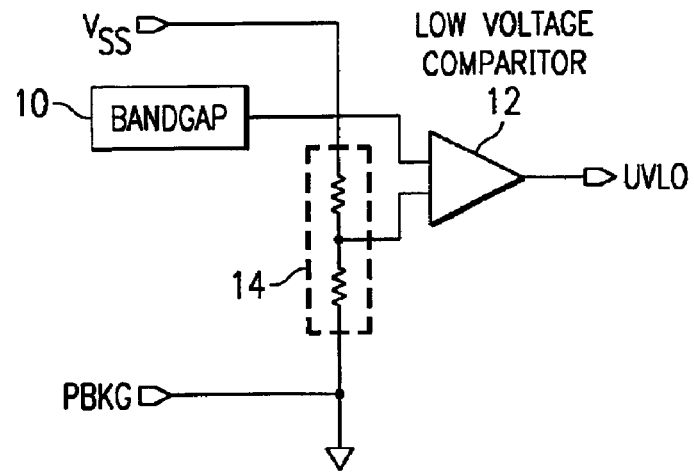
FIG. 1 is a schematic circuit diagram of a prior art undervoltage lockout circuit.
Figure 2:
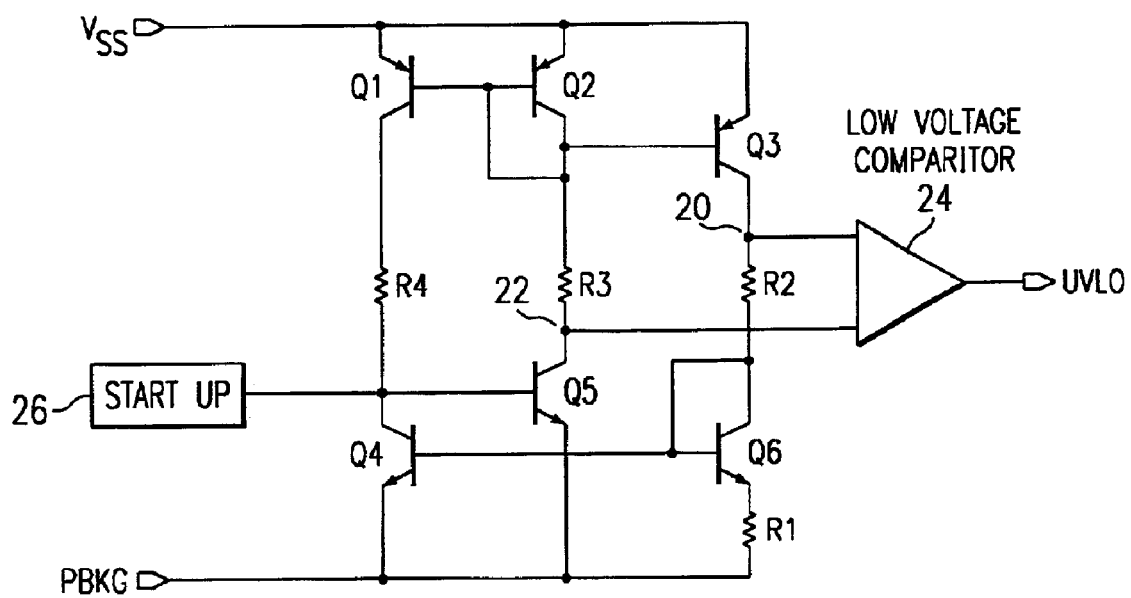
FIG. 2 is a schematic circuit diagram of a preferred embodiment undervoltage lockout circuit.

A preferred embodiment undervoltage (UVLO) circuit is shown in FIG. 2. The circuit of FIG. 2 provides an accurate UVLO circuit that has a very low quiescent current that is independent of supply voltage. It is also a very small circuit that has a minimum number of active components and a low amount of resistance to minimize its area.

In the preferred embodiment circuit of FIG. 2, transistors Q1–Q6 and resistor R1 make a standard low voltage IPTAT (current proportional to absolute temperature) generator. By adding resistor R2 in series with transistor Q6, a bandgap voltage is formed at node 20 with respect to ground PBKG. Adding resistor R3 in series with transistor Q2 forms a bandgap voltage with respect to the supply VSS. The voltage at nodes 20 and 22, with respect to ground, will be equal when the input voltage VSS is equal to two bandgap voltages. By using a low voltage comparator 24 that is biased off the IPTAT generator, a UVLO signal will be generated.

Resistor R4 is optional, but it adds precision and DC power supply rejection by matching the voltages across transistors Q1 and Q3. The circuit of FIG. 2 also includes start up circuit 26.

As can be seen, the circuit of FIG. 2 has several advantages. The first advantage is that there is not a resistor divider from the input supply VSS to ground PBKG Therefore, the quiescent current is a function of the delta Vbe (transistor base-to-emitter voltage) divided by resistor R1 in the IPTAT generator. Thereby making the quiescent current independent of the input voltage VSS and the total amount of resistance required for higher voltage operation much less. Second, the trip point is the comparison of two bandgap voltages at nodes 20 and 22, therefore the trip point should be very accurate and independent of temperature. And last, this circuit can operate down to a very low input voltage. The IPTAT generator itself will work down to a bandgap voltage plus a Vbe saturation (approximately 1.4V). But the signals to the comparator 24 will be valid down to a Vbe. Assuming the comparator 24 crushes in the right state, the UVLO will be accurate down to 0V.

Figure 3:
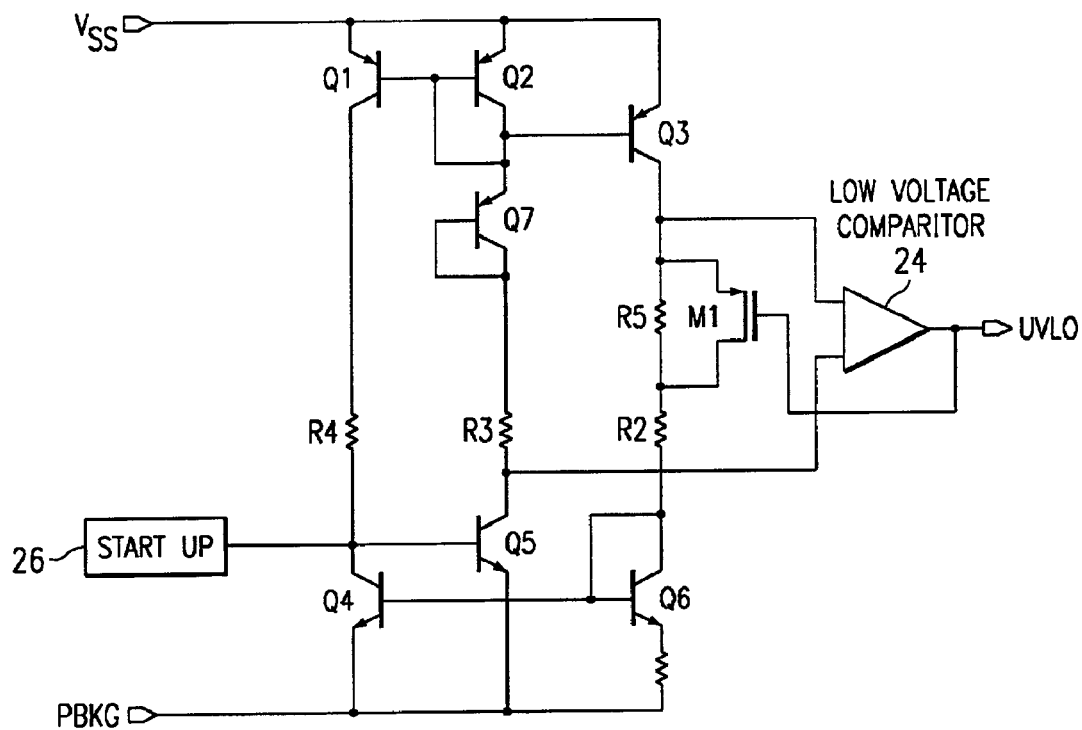
FIG. 3 is a schematic circuit diagram of a first alternative embodiment undervoltage lockout circuit.
Figure 4:
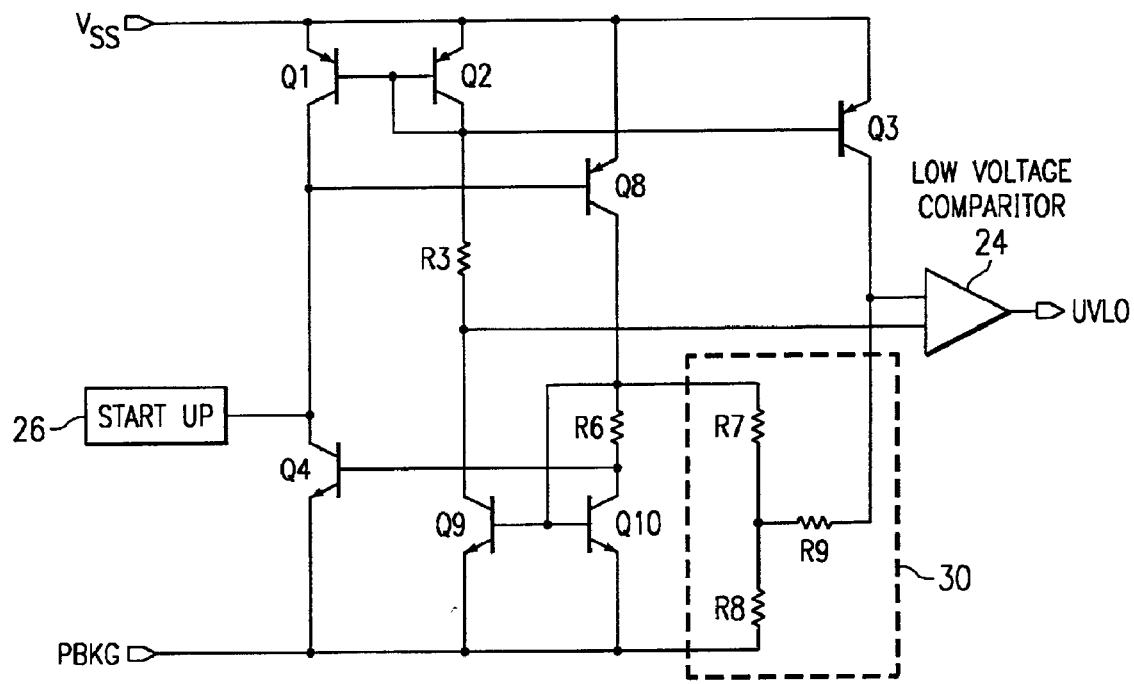
FIG. 4 is a schematic circuit diagram of a second alternative embodiment undervoltage lockout circuit.

Additionally, variations of this circuit can be seen in alternative embodiments shown in FIG. 3 and FIG. 4. The trip voltage can be easily modified to be multiples of the bandgap voltage as shown in FIG. 3. In addition to the circuit components of FIG. 2, the circuit of FIG. 3 also includes diode connected transistor Q7, resistor R5, and transistor M1. Also, in FIG. 3, hysterisis can be added by shorting out part of the resistor R3 based on the UVLO signal. The UVLO can be realized with hysteresis that does not increase quiescent current.

The circuit of FIG. 3 demonstrates the implementation of two variations. First, transistor Q7 was added to make the voltage of the input referred bandgap to be twice the bandgap voltage. This allows the UVLO trip voltage to be set as multiples of the bandgap voltage (normally 1.25V). The trip voltage can be set at 2.5V, 3.75V, 5.0V, etc. The second variation is the addition of resistor R5 and transistor M1 to add hysterisis to the UVLO trip points. This adds immunity to supply noise.

The trip voltage can be any voltage by using a fractional bandgap structure as shown in FIG. 4. The circuit of FIG. 4 includes transistors Q1–Q4 and Q8–Q10; and resistors R3 and R6; and resistor network 30 which includes resistors R7, R8, and R9. The circuit of FIG. 4 demonstrates how the UVLO trip point can be set to an arbitrary value using a sub-bandgap reference circuit. This is integrated into a bias generator circuit to save components and bias current, and the bias current is independent of input voltage.

In the circuit of FIG. 4, the voltage across transistor Q2 and resistor R3 forms a bandgap voltage from the input rail. A sub-bandgap reference voltage is formed by the base-emitter voltage of transistor Q10, resistors R7, R8, R9, and the IPTAT current from transistor Q3. By selection of the resistor values and IPTAT current from Q3, the temperature independent reference voltage can be set to a voltage lower than the natural bandgap voltage. By using this circuit, the UVLO trip points can be set to an arbitrary value instead of integer multiples of the bandgap voltage as in the circuit of FIG. 3.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
   a comparator;
   an IPTAT generator;
   a first input of the comparator coupled to a first node of the IPTAT generator, wherein the first node forms a bandgap voltage with respect to a reference node; and
   a second input of the comparator coupled to a second node of the IPTAT generator, wherein the second node forms a bandgap voltage with respect to an input node.

2. The circuit of claim 1 wherein the IPTAT generator comprises:
   a first transistor;
   a second transistor coupled in series with the first resistor;
   a third transistor having a control node coupled to the control node of the first transistor;
   a first resistor coupled in series with the third transistor;
   a fourth transistor coupled in series with the first resistor and having a control node coupled to the second transistor, the fourth transistor is coupled to the second input of the comparator;
   a fifth transistor having a control node coupled to the third transistor, the fifth transistor is coupled to the first input of the comparator;
   a second resistor coupled in series with the fifth transistor;
   a sixth transistor coupled in series with the second resistor and having a control node coupled to a control node of the second transistor; and
   a third resistor coupled in series with the sixth transistor.

3. The circuit of claim 1 further comprising a start up circuit coupled to the IPTAT generator.

4. The circuit of claim 2 further comprising a start up circuit coupled to the second transistor.

5. The circuit of claim 2 further comprising a diode coupled between the third transistor and the first resistor.

6. The circuit of claim 2 further comprising:
   a fourth resistor coupled between the fifth transistor and the second resistor; and
   a seventh transistor coupled in parallel with the fourth resistor and having a control node coupled to an output of the comparator.

7. The circuit of claim 2 wherein the first through sixth transistors are bipolar transistors.

8. The circuit of claim 2 wherein the first, third, and fifth transistors are PNP transistors and the second, fourth, and sixth transistors are NPN transistors.

9. The circuit of claim 6 wherein the seventh transistor is a MOSFET.

10. The circuit of claim 2 further comprising a fourth resistor coupled between the first transistor and the second transistor.

11. The circuit of claim 1 wherein the IPTAT generator comprises:
    a first transistor;
    a second transistor coupled in series with the first resistor;
    a third transistor having a control node coupled to the control node of the first transistor;
    a first resistor coupled in series with the third transistor;
    a fourth transistor coupled in series with the first resistor, the fourth transistor is coupled to the second input of the comparator;
    a fifth transistor having a control node coupled to the first transistor;
    a second resistor coupled in series with the fifth transistor;
    a sixth transistor coupled in series with the second resistor and having a control node coupled to a control node of the fourth transistor;
    a seventh transistor coupled to the third transistor, the seventh transistor is coupled to the first input of the comparator; and
    a resistor network having a first node coupled to the seventh transistor and a second node coupled to the fifth transistor.

* * * * *